US008016335B2

(12) United States Patent
McKay

(10) Patent No.: US 8,016,335 B2
(45) Date of Patent: Sep. 13, 2011

(54) DUAL HANDLE ADJUSTABLE DRAG STRAP

(75) Inventor: Sean McKay, Greenville, SC (US)

(73) Assignee: North American Rescue, LLC, Greer, SC (US)

( * ) Notice: Subject to any disclaimer, the term of this patent is extended or adjusted under 35 U.S.C. 154(b) by 515 days.

(21) Appl. No.: 12/287,972

(22) Filed: Oct. 14, 2008

(65) Prior Publication Data

US 2010/0026025 A1 Feb. 4, 2010

Related U.S. Application Data

(60) Provisional application No. 60/999,186, filed on Oct. 16, 2007.

(51) Int. Cl.
*B65G 7/12* (2006.01)
*A61G 99/00* (2006.01)

(52) U.S. Cl. ........ 294/152; 294/141; 294/150; 294/153; 294/165

(58) Field of Classification Search .................... 294/74, 294/140, 141, 149, 150, 152, 153, 156, 165
See application file for complete search history.

(56) References Cited

U.S. PATENT DOCUMENTS

| | | | | |
|---|---|---|---|---|
| 153,724 A | | 7/1874 | Schmidt | |
| 2,699,284 A | | 1/1955 | Rose | |
| 3,034,596 A | | 5/1962 | Twaits, Jr. | |
| 3,074,074 A | | 1/1963 | Lovering | |
| 3,322,102 A | | 5/1967 | Windle | |
| 4,298,091 A | | 11/1981 | Anderson | |
| 4,529,240 A | * | 7/1985 | Engel | 294/141 |
| 4,854,418 A | | 8/1989 | Hengstenberger et al. | |
| 4,863,409 A | | 9/1989 | Johnson et al. | |
| 4,922,860 A | * | 5/1990 | Hutchings | 482/69 |
| 4,925,070 A | | 5/1990 | Tulgan | |
| 5,113,981 A | | 5/1992 | Lantz | |
| 5,279,386 A | | 1/1994 | Cearley | |
| 5,345,947 A | | 9/1994 | Fisher | |
| 5,351,654 A | | 10/1994 | Fuentes | |
| 5,388,551 A | | 2/1995 | Martusciello | |
| 5,435,272 A | | 7/1995 | Epstein | |
| 5,619,955 A | | 4/1997 | Nelson | |
| 5,718,189 A | | 2/1998 | Blake | |
| 5,732,662 A | | 3/1998 | Jacobsen | |
| 5,787,500 A | | 8/1998 | Lobello | |
| 5,842,444 A | | 12/1998 | Perrulli | |
| 5,960,480 A | | 10/1999 | Neustater et al. | |
| 5,971,668 A | | 10/1999 | Miller | |
| 6,050,869 A | | 4/2000 | Kellett | |
| 6,089,636 A | * | 7/2000 | Harris | 294/150 |
| 6,125,792 A | | 10/2000 | Gee | |
| 6,205,584 B1 | | 3/2001 | Yocco | |
| 6,250,699 B1 | * | 6/2001 | Robertson | 294/153 |
| 6,256,789 B1 | | 7/2001 | Young et al. | |
| 6,305,024 B1 | | 10/2001 | Schweer | |
| 6,338,699 B1 | | 1/2002 | Veitch | |
| D454,235 S | | 3/2002 | Kaplan | |
| 6,450,930 B1 | * | 9/2002 | Kroke | 482/121 |

(Continued)

*Primary Examiner* — Dean Kramer
(74) *Attorney, Agent, or Firm* — McNair Law Firm, P.A.; Seann P. Lahey

(57) ABSTRACT

A drag strap having a dual handle system for allowing one or more persons to use the strap when dragging an injure person. The drag strap is preferably constructed of a high tensile strength woven nylon tape which is flexible and weather resistant. The drag strap includes an adjustable connector system for quick attachment and adaptability in securing the strap to an injured person.

19 Claims, 5 Drawing Sheets

U.S. PATENT DOCUMENTS

| | | | | |
|---|---|---|---|---|
| 6,569,005 | B2 * | 5/2003 | Maxwell | 452/128 |
| 6,637,547 | B1 | 10/2003 | Wydner | |
| 6,651,594 | B1 | 11/2003 | Bagwell | |
| 6,675,742 | B1 | 1/2004 | Shiraki | |
| 6,808,046 | B1 | 10/2004 | Henson | |
| 6,827,045 | B1 | 12/2004 | Willner et al. | |
| 6,851,393 | B2 | 2/2005 | Bremm | |
| 6,871,368 | B2 | 3/2005 | Calkin | |
| 6,892,395 | B2 | 5/2005 | Schweer | |
| 6,908,131 | B2 * | 6/2005 | Main et al. | 294/150 |
| D509,329 | S | 9/2005 | Willner et al. | |
| 6,968,809 | B2 | 11/2005 | Reardon | |
| 6,990,928 | B2 | 1/2006 | Kurtgis | |
| 7,025,172 | B2 | 4/2006 | Gregory | |
| 7,086,091 | B2 | 8/2006 | Jordan | |
| D539,489 | S | 3/2007 | Scott | |
| 7,188,585 | B1 | 3/2007 | Carter | |
| 2004/0182644 | A1 | 9/2004 | Kotarski | |
| 2005/0211188 | A1 | 9/2005 | Grilliot et al. | |
| 2006/0070800 | A1 | 4/2006 | Lewis et al. | |
| 2007/0044197 | A1 | 3/2007 | Turcotte et al. | |
| 2007/0084667 | A1 | 4/2007 | Waters et al. | |
| 2007/0169246 | A1 | 7/2007 | Sloan et al. | |
| 2007/0192926 | A1 | 8/2007 | Fee et al. | |
| 2008/0184488 | A1 | 8/2008 | Fee et al. | |
| 2008/0289086 | A1 | 11/2008 | Grilliot et al. | |

* cited by examiner

DUAL HANDLE ADJUSTABLE DRAG STRAP

CROSS REFERENCE TO RELATED APPLICATION

This application claims priority of Provisional Application Ser. No. 60/999,186, filed Oct. 16, 2007.

BACKGROUND OF THE INVENTION

1) Field of the Invention

The present invention relates to safety and rescue extraction of downed or injured law enforcement, military or tactical operations personnel from a hostile combat environment, and more particularly, to a dual handle drag strap that will allow a user in a combat situation to drag an injured person to safety without compromising the user's ability to maintain engagement with an enemy.

2) Description of Related Art

Today, tactical law enforcement and military personnel face more challenges than ever and the threats are increasingly more dangerous. Rescuers working to remove injured personnel in a hostile combat environment also face many challenges. Traditional methods of removing an injured person typically require three to four people on average to grab the injured person anyway they can and drag them to safety. These methods are time consuming, overly strenuous, unreliable, and expose the rescuers to increased damages as they lower their guard to rescue the injured person. Grabbing the protective vest or other gear of the injured person to drag them to safety can make it difficult to obtain sufficient leverage for moving quickly. Also, it is difficult to obtain a good grip and the section being grabbed may fail from the weight when the person is being dragged. Also, currently methods create unnecessarily longer exposure times on the "X" for the rescuers, subjecting both the rescuers and injured person to continued hostile fire. Further, current extraction methods tend to cause the rescuer to disengage from the enemy when attempting to grab the injured person, leading to potentially deadly results.

Further, depending on the personal protective gear worn by the injured person, it can be difficult to locate an attachment point for a drag strap. Accordingly, there is a need for a drag strap that can accommodate and adjust to work with or without a variety of protective gear while still providing a secure attachment to the injured person for rapid extraction.

It is also desirable to allow more than one person to use a single drag strap to rescue an injured person for decreased drag load on a single person and quicker extraction. Accordingly, there is a need to provide a drag strap with multiple handles for allowing more than one person to drag the injured person.

In short, prior methods of rapid extraction took more people, more time, and left the rescuer(s) and injured person exposed to the threat. Accordingly, a need was realized for more efficient ways to remove injured personnel that is quick, reliable, and limits dangerous exposure of the rescuers and the injured person during extraction.

Thus, it is an object of the present invention to provide a rapid extraction drag strap that allows for one or more people to drag a person to safety, but also reduces the amount of time and effort needed to do so.

It is a further object of the present invention to provide a drag strap that is adjustable to accommodate variations in attachment methods for attaching to an injured person.

It is a further object of the present invention to provide a drag strap that allows a rescuer to drag the injured person to a safe location without having to disengage his weapon from the enemy.

It is a further object of the present invention to provide a drag strap that promotes a preferred posture for the rescuer to drag the injured person in an efficient manner.

SUMMARY OF THE INVENTION

The above objectives are accomplished according to the present invention by providing a dual handle adjustable drag strap for extracting an injured person from a combat environment without the rescuer exposing himself in a position that would prevent him from returning fire on hostile combatants. In an embodiment of the invention, a drag strap is provided having a dual handle system for allowing one or more persons to use the strap when dragging an injured person to decrease drag load on a single person and promote quicker extraction. The drag strap also preferably includes an adjustable connector system for quick attachment to an injured person for dragging to safety.

The drag strap is preferably constructed of a high tensile strength woven nylon tape which is flexible and weather resistant. The adjustable connector system includes a coupling member, such as a quick connector, for attachment to the personal protective equipment worn by the injured person. Alternatively, the drag strap includes a bull ring for cooperating with the quick connector so that the drag strap can be wrapped around part of the person being rescued and then connected to the bull ring by the quick connector so that when the drag strap is pulled it quickly adjusts and cinches to provide a tight connection around the person being rescued.

To provide further adaptable connectivity configurations, a pair of attachment loops are disposed between the dual handles and distal end of the strap. These attachment loops can be used as an alternative attachment point for the quick connector for securing the drag strap around a portion of the injured person. Further, the attachment loops can be used to shorten the length of the strap, particularly for head first drags. In a further embodiment, the attachment loops may carry a secondary quick connector to provide an alternative attachment point for directly connecting to the injured person for a shorter drag strap length for selected dragging positions.

In a primary embodiment of the invention, the above objectives are accomplished by providing a dual handle adjustable drag strap comprising a first strap and a second strap secured together at a first distal end so that the first and second straps extend independently from each other; a first handle loop included on the first strap at a second distal end of the first strap; a first attachment loop carried on the first strap disposed below and generally adjacent the first handle loop; a second handle loop included on the second strap at a second distal end of the second strap; a second attachment loop carried on the second strap disposed below and generally adjacent the second handle loop at a complimentary location to the first attachment loop on the first strap; a floating bull ring slidably carried on the first and second straps between the first distal end and the first and second attachment loops; and, a quick connector carried at the first distal end connecting to one of the bull ring and the first and second attachment loops to very the length of the drag strap and secure the drag strap to an injured person.

In a further embodiment, an end loop is disposed at the first distal end carrying the quick connector.

In a further embodiment, the first and second straps, the first and second attachment loops, the first and second handle loops and the end loop are defined by a single continuous strip of foldable high tensile strength woven nylon material.

In a further embodiment, the nylon material is generally one inch wide flat nylon tape so that when folded over against itself allows for compact storage and transportation.

In a further embodiment, the quick connector includes an oblong metal ring with a spring clip for rapid attachment and disengagement from the bull ring and the attachment loops.

In a further embodiment, the bull ring has approximately a 2" diameter to receive the first and second straps and the quick connector without binding while sliding on the straps.

In a further embodiment, the first and second straps are secured together at the first distal end using a triple bar-tacked stitching; and wherein the first and second attachment loops are secured to the first and second straps using a triple bar-tacked stitching to resist separation under heavy loads.

In a further embodiment, the bar-tacked stitching includes three rows of stitched thread generally extending across the width of the straps with each of the rows being spaced approximately ¼ inches apart.

In a further embodiment, the first and second handle loops each include a handle grip slidably carried on each of the handle loops for improved comfort and grip when pulling on the handle loops.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
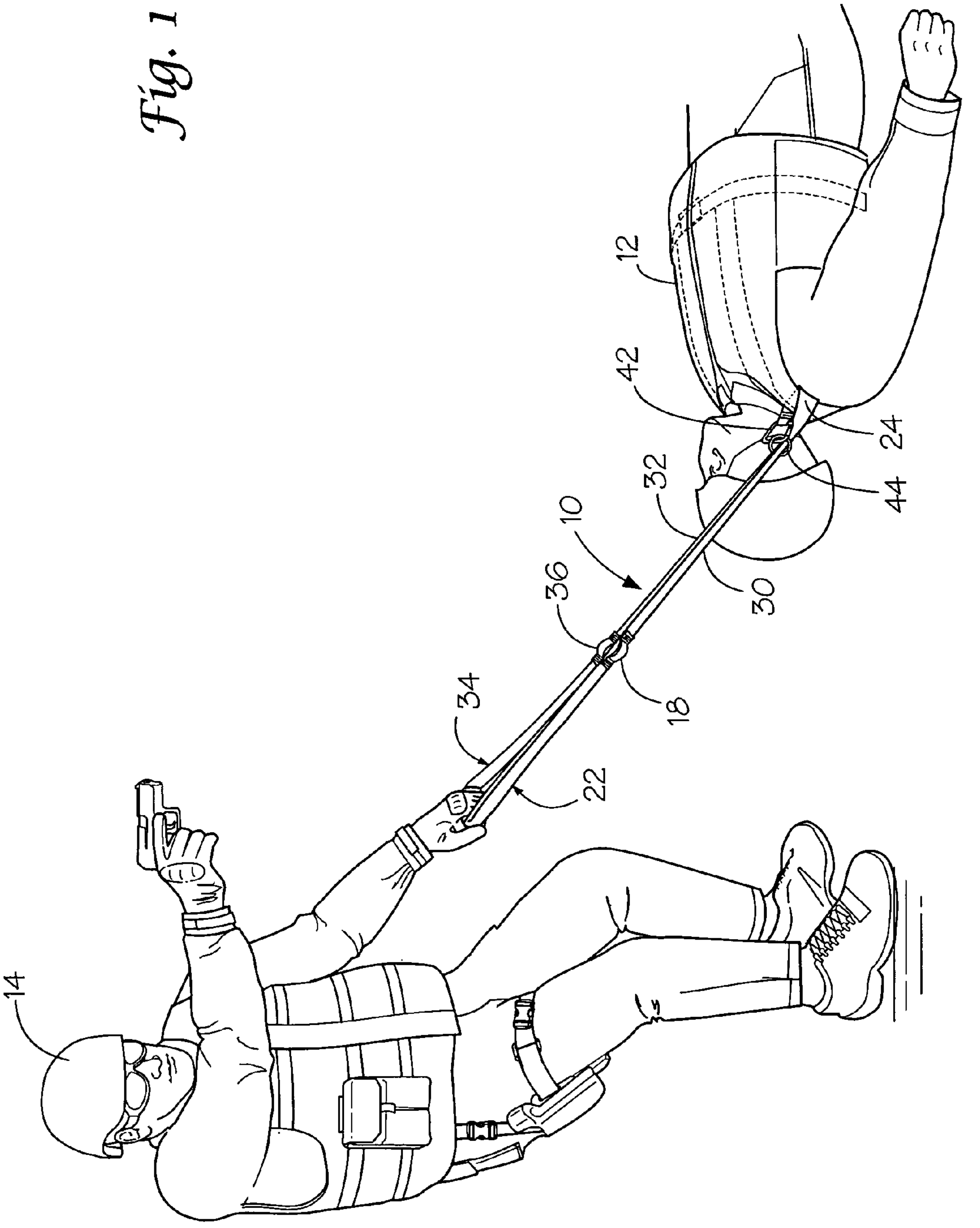
FIG. 1 shows a perspective view of the drag strap attached to an injured person for head first dragging according to the present invention.
Figure 4:
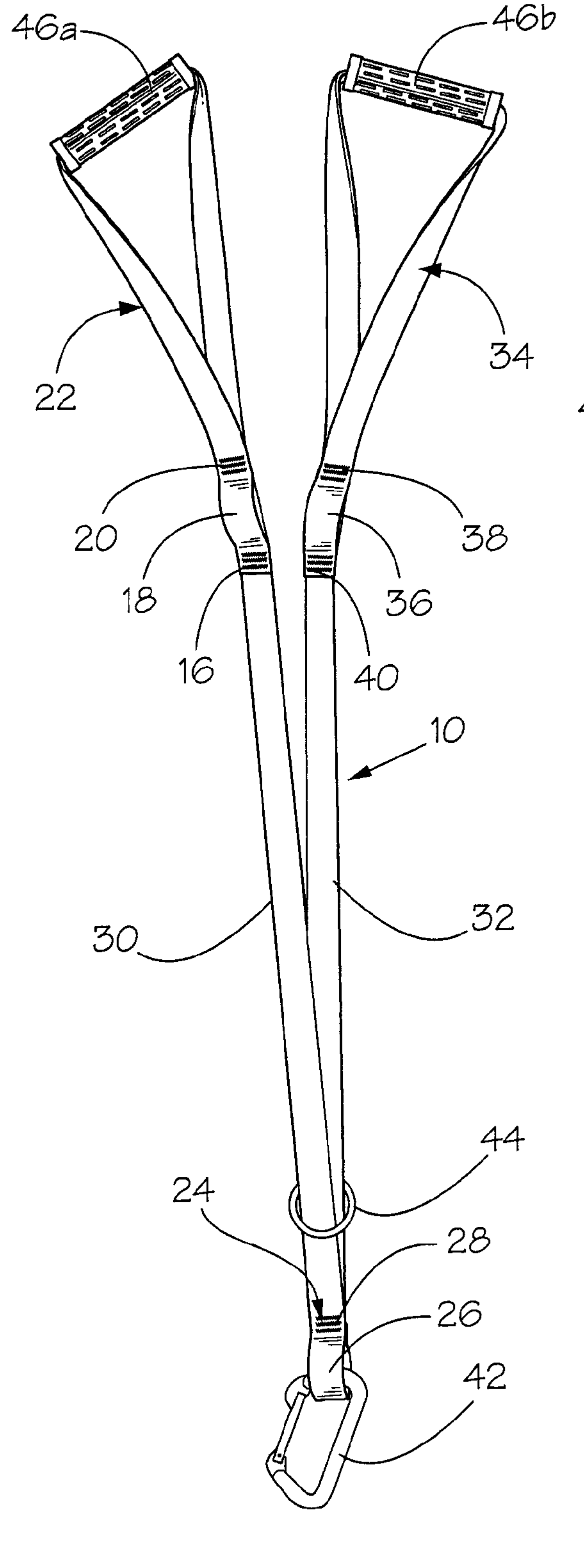
FIG. 4 shows a detailed perspective view of the drag strap according to the present invention.

With reference to the drawings, the invention will now be described in more detail. Referring to FIGS. 1 and 4, a dual handle adjustable drag strap, designated generally as 10, is shown. Drag strap 10 allows for extraction of an injured person 12 from a combat environment without the rescuer 14 exposing himself in a position that would prevent him from returning fire on hostile combatants.

In one embodiment, drag strap 10 consists of a high tensile strength foldable webbing material, such as a woven nylon tape commonly referred to as tech tape, that is preferably flexible and weather resistant. Preferably, drag strap 10 is constructed of 1" wide flat nylon tape with a tensile strength of approximately 4200 lbs. for extreme durability and resistance to failure during use, although other dimensions and materials are considered within the spirit and scope of the invention. Using nylon tape allows the strap to be folded over on itself for compact storage and transportation.

A single strip of nylon tape may used to form the drag strap to simplify production and reduce stitching points to prevent failure of joints under heavy load. Referring to FIG. 4, the nylon tape for drag strap 10 can start at stitch point 16 where one end of the tape is stitched onto a portion of the length of drag strap 10. From there, a first attachment loop 18 is formed by bunching the tape between stitch point 16 and a following stitch point 20. Above stitch point 20, the nylon tape material is arranged to form a first handle loop, designated generally as 22. The nylon tape then runs from stitch points 16 and 20 to first distal end, designated generally as 24. At first distal end 24 an end loop 26 is formed by stitch point 28. Stitch point 28 secures the nylon tape back onto itself after defining end loop 16 to further define a first strap 30 and a second strap 32 secured together at a first distal end 24 by stitch point 28 so that said first and second straps 30 and 32, respectively, extend independently from each other. First handle loop 22 is thus disposed on a second distal end of first strap 30. The nylon tape material is then looped at a second distal end of second strap 32 opposite first distal end 24 to define a second handle loop, designated generally as 34. Finally, a second attachment loop 36 is defined by bunching the nylon tape between stitch points 38 and 40. As illustrated, in the preferred embodiment, first attachment loop 18 and second attachment loop 36 are disposed below and generally adjacent to first handle loop 22 and second handle loop 34, respectively. In this manner a single strip of woven nylon tape material can be arranged to construct dual handle drag strap 10.

Referring to FIG. 4, first and second straps 30 and 32 are secured together at first distal end 24 at stitch point 28 using a triple bar-tacked stitching that provides extreme durability and redundancy to prevent separation. Further, it is preferred that first and second attachment loops 18 and 36 are secured to first and second straps 30 and 32, respectively, also using a triple bar-tacked stitching to resist separation under heavy loads. In a further embodiment, the bar-tacked stitching at stitch points 16, 20, 28, 38, and 40 includes three rows of stitched thread generally extending across the width of the straps with each of the rows being spaced approximately ¼ inches apart.

Each of handle loops 22 and 34 preferably include a hollow-cored handle grip 46*a* and 46*b* slidably carried on each of handle loops 22 and 34 accordingly. Preferably, handle grips 46*a* and 46*b* are made of a weather-proof flexible material that offer additional grip and comfort to the rescuer during dragging. Using a flexible material for the handle grip, such as a light rubber or foam, helps in carrying drag strap 10 which is intended to be folded and carried in a pocket of the rescuer. The flexible handle also helps to protect against injury from falling on a hard plastic handle, or from fragmentation of a hard plastic or other material if subjected to enemy fire.

Figure 2:
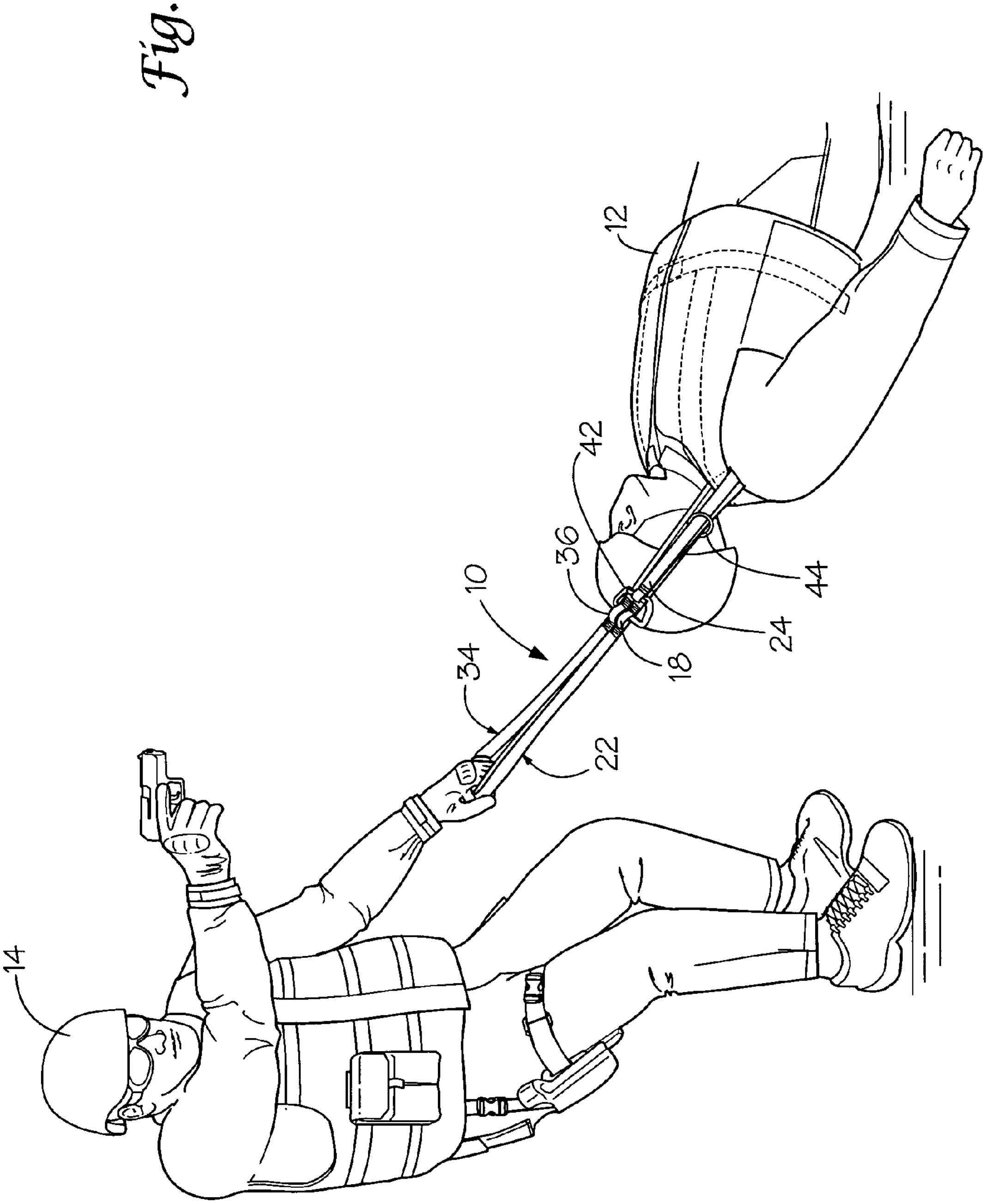
FIG. 2 shows a perspective view of an alternative arrangement of attaching the drag strap to an injured person for head first dragging according to the present invention.
Figure 3:
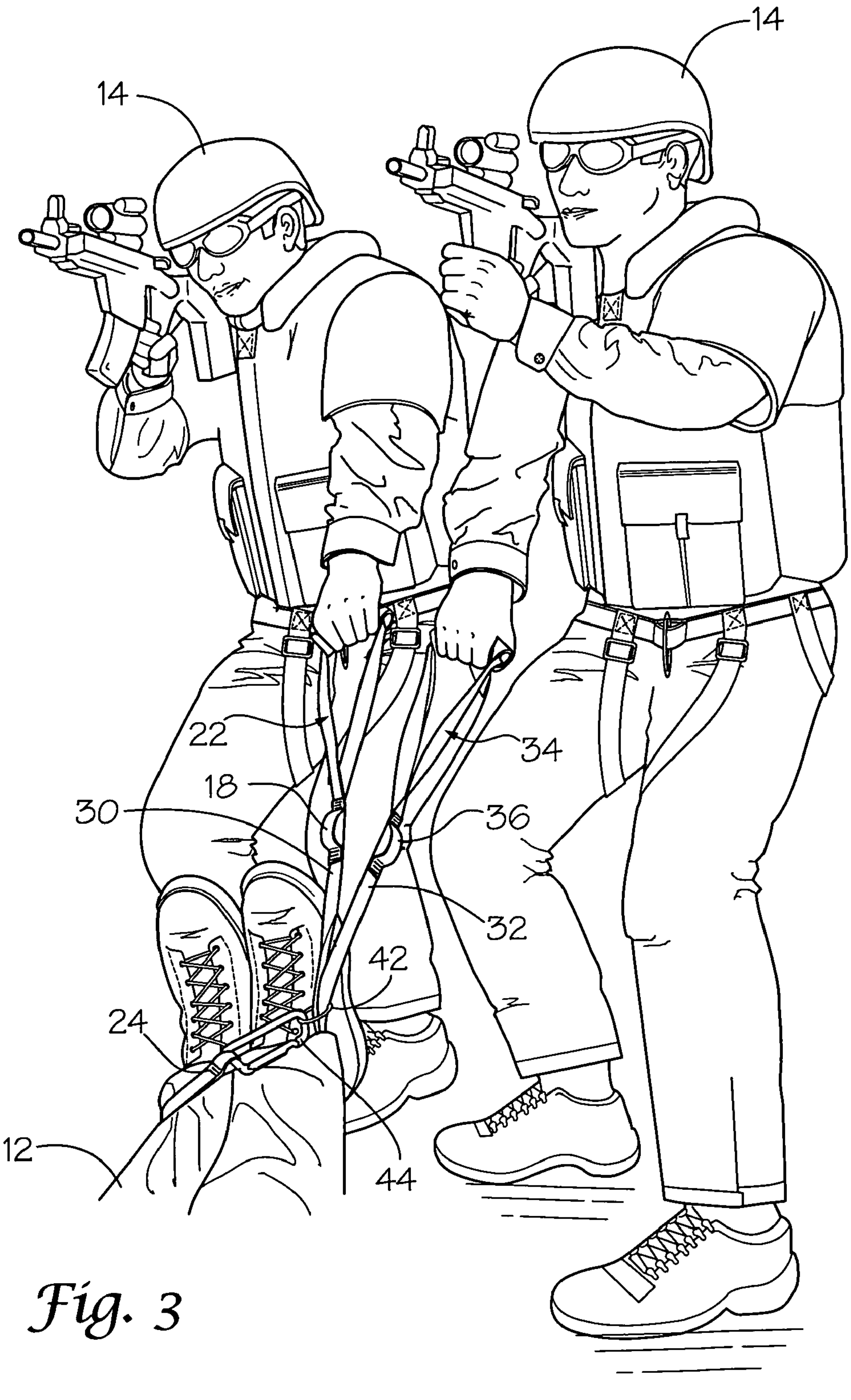
FIG. 3 shows a perspective view of an alternative attachment arrangement of the drag strap for feet first dragging according to the present invention.

Referring to FIGS. 1-3, drag strap 10 is provided having a dual handle system for allowing one or more persons to use straps 30 and 32 when dragging an injured person. With two available handle loops and straps, drag load on a single person is decreased and promotes quicker extraction. FIGS. 1 and 2 illustrate alternative attachment arrangements for a single rescuer performing head first drags, while FIG. 3 illustrates a feet first drag having two rescuers utilizing drag strap 10 simultaneously for rapid extraction.

In addition to the dual handle system, drag strap 10 includes an adjustable connector system for quick attachment to an injured person that accommodates a variety of attachment methods as may be required in the field to effectively attach drag strap 10 to the injured person. The adjustable connector system includes a coupling member 42 carried by end loop 26 at first distal end 24. Preferably, coupling member 42 comprises a quick connector for connecting to one of floating bull ring 44 and first and second attachment loops 18 and 36 to vary the length of the drag strap and secure the drag strap to an injured person. In a preferred embodiment, the quick connector comprises an oblong metal ring with a spring clip for rapid attachment and disengagement from said bull ring and said attachment loops, such as a non-locking carabineer. Coupling member 42 can be quickly attached directly to the personal protective equipment or drag harness that may be worn by the injured person. In one attachment method, quick connector 42 secures first distal end 24 of drag strap 10 directly to the vest or pre-rigged anchor point on the injured person. As an injured person may not be equipped with a vest containing a pre-rigged anchor point, the versatility of the connection options of drag strap 10 may be utilized as illustrated in FIG. 1-3.

To facilitate the adjustable nature and versatility of drag strap 10, the drag strap includes a floating bull ring 44 carried on first and second straps 30 and 32 sliding between distal end 24 and attachment loops 18 and 36 for cooperating with quick connector 42. Preferably, bull ring 44 has approximately a 2" diameter to receive first and second straps 30 and 32, as well as quick connector 42 without binding while sliding on straps 30 and 32.

Figure 6:
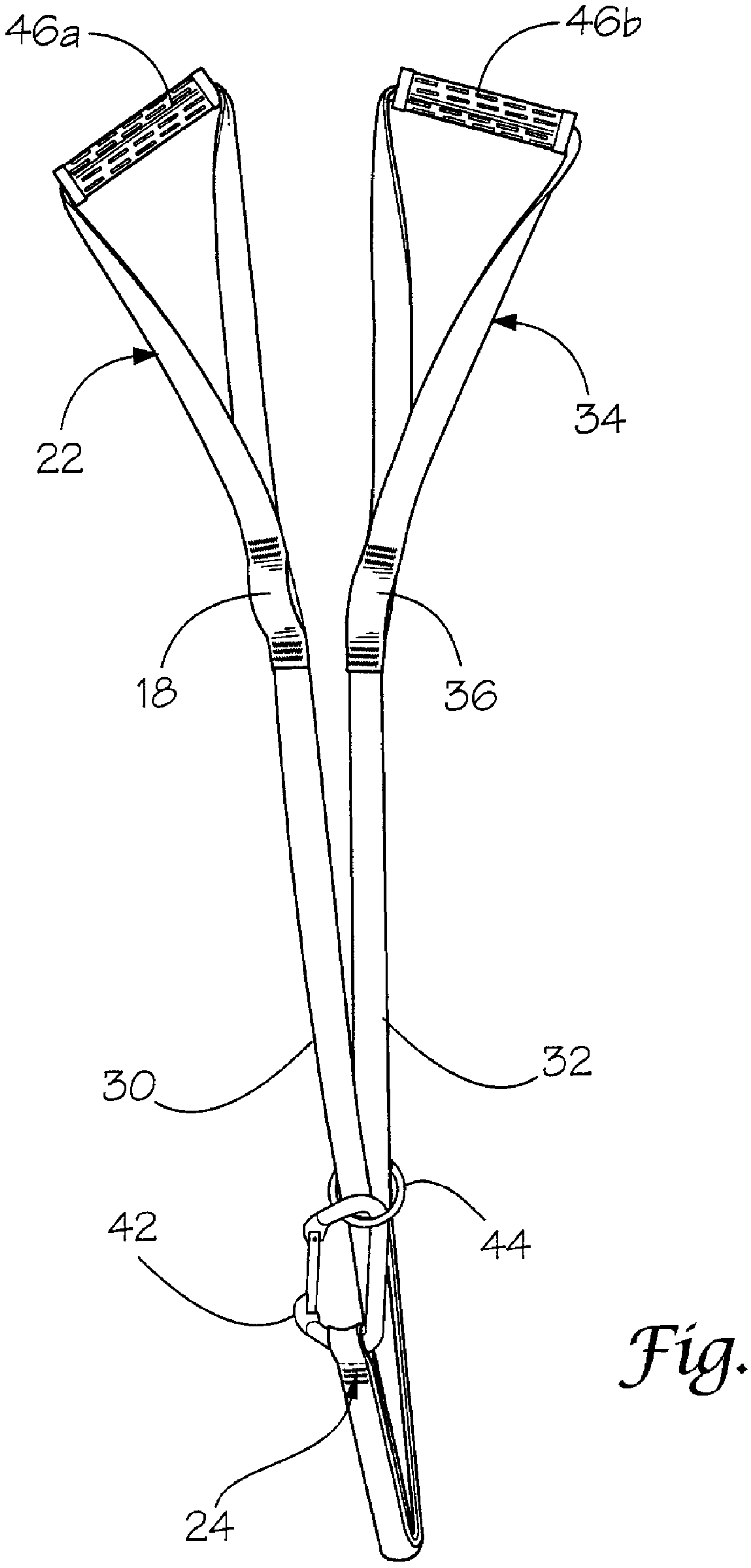

Referring to FIG. 1 and 6, floating bull ring 44 allows for drag strap 10 to be wrapped around part of the person being rescued and then quick connector 42 being coupled to bull ring 44 to complete securing drag strap 10 to the injured person. When drag strap 10 is pulled, it quickly cinches around the injured person when bull ring 44 slides down straps 30 and 32 and provides a tight connection for dragging the injured person. Thus, in the event the rescuer cannot directly attach quick connector 42 to the vest or pre-rigged anchor point on the injured person, drag strap 10 can still be used to rescue the downed person. For example, as illustrated in FIG. 1, first distal end 24 is threaded underneath the injured person's vest under the shoulder strap area. Quick connector 42 is then connected to floating bull ring 44 and the newly created attachment loop cinched to tighten around the injured person's vest. Optionally, quick connector 42 could be attached directly to drag strap 10 without bull ring 44, but may not slide as intended.

Alternatively, referring to FIGS. 3 and 6, drag strap 10 could be wrapped around the feet of the injured person so that quick connector 42 is connected to bull ring 44 to form a loop that is then cinched tight when the rescuers start to drag the injured person.

Figure 5:
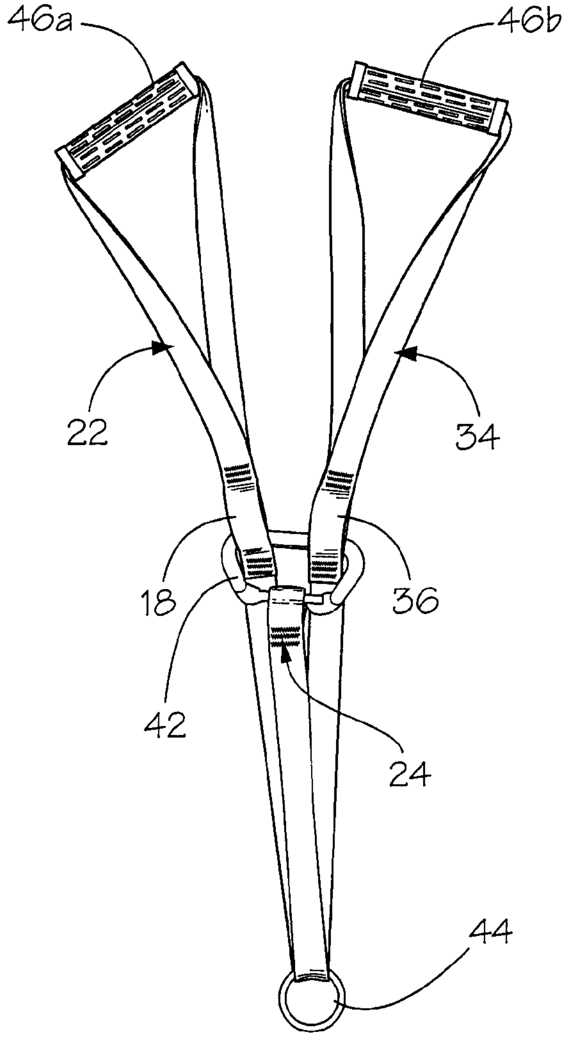
FIG. 5 shows a perspective view of an attachment arrangement with the coupling member connected to the attachment loops according to the present invention; and, FIG. 6 shows a perspective view of an attachment arrangement with the coupling member connected to the bull ring according to the present invention.

To provide further adaptable connectivity configurations, the pair of attachment loops 18 and 36 are disposed between handle loops 22 and 34 and first distal end 24. Referring to FIG. 2 and 5, these attachment loops 18 and 36 can be used as an alternative attachment point for quick connector 42, as opposed to bull ring 40, for securing drag strap 10 around a portion of the injured person or their personal protective equipment where a shorter strap length may be required. This is particularly preferred for head first drags as it promotes lifting of the injured person's head off the ground during dragging. In a further embodiment, attachment loops 18 and 36 may carry a secondary quick connector (not shown) to provide an alternative attachment point for directly connecting to the injured person for a greatly reduced drag strap length. This alternative direct attachment method is primarily intended for head first drag so that the head of the injured person is more likely to be lifted off the ground during dragging.

In summary, this unique extraction tool is ideal for open-field and indoor-corridor rescues. Two weather-proof flexible handle grips 46*a* and 46*b* offer additional grip and comfort to the rescuer. Floating bull ring 40 and alternative attachment loops 18 and 36 provide multiple adjustable attachment point configurations. The innovative adjustable configuration is designed to offer multiple reinforced attachment options for accommodating various attachment methods and variations in terrain at the rescue site. Use of this tool as intended allows the rescuer to maintain engagement with threat during the extraction process, thus minimizing deadly exposure on the "X". Drag strap 10 promotes and utilizes improved body mechanics by maintaining an anatomically correct posture and increased leverage to allow a single person to rapidly extract larger weight persons in a quick and efficient manner, thus again minimizing deadly exposure on the "X". Use of drag strap 10 also allows the injured person to maintain a natural prone posture and positions that preclude shifting of personal protective equipment (ppe) that either obviates that equipment or exposes additional unprotected body regions, as well as keeping the profile of the injured person to a minimum through horizontal dragging. Use of drag strap 10 also leads to decreased manpower needs in zeroed in location by allowing a single person to do a job that has traditionally been done by three to four people. Optionally, the dual handle system allows for two people to rapidly extract an injured person, while the adjustable attachment features allows for head first as well as feet first drags.

While a preferred embodiment of the invention has been described using specific terms, such description is for illustrative purposes only, and it is to be understood that changes and variations may be made without departing from the spirit or scope of the following claims.

What is claimed is:

1. A dual handle adjustable drag strap comprising:

a first strap and a second strap secured together at a first distal end so that said first and second straps extend independently from each other;

a first handle loop included on said first strap at a second distal end of said first strap;

a first attachment loop carried on said first strap disposed below and generally adjacent said first handle loop;

a second handle loop included on said second strap at a second distal end of said second strap;

a second attachment loop carried on said second strap disposed below and generally adjacent said second handle loop at a complimentary location to said first attachment loop on said first strap;

a floating bull ring slidably carried on said first and second straps between said first distal end and said first and second attachment loops; and, a quick connector carried at said first distal end connecting to one of said bull ring and said first and second attachment loops to vary the length of the drag strap and secure the drag strap to an injured person.

2. The drag strap of claim 1 including an end loop disposed at said first distal end carrying said quick connector.

3. The drag strap of claim 2 wherein said first and second straps, said first and second attachment loops, said first and second handle loops and said end loop are defined by a single continuous strip of foldable high tensile strength woven nylon material.

4. The drag strap of claim 3 wherein said nylon material is generally one inch wide flat nylon tape so that when folded over against itself allows for compact storage and transportation.

5. The drag strap of claim 1 wherein said quick connector includes an oblong metal ring with a spring clip for rapid attachment and disengagement from said bull ring and said attachment loops.

6. The drag strap of claim 1 wherein said bull ring has approximately a 2" diameter to receive said first and second straps and said quick connector without binding while sliding on said straps.

7. The drag strap of claim 1 wherein said first and second straps are secured together at said first distal end using a triple bar-tacked stitching; and wherein said first and second attachment loops are secured to said first and second straps using a triple bar-tacked stitching to resist separation under heavy loads.

8. The drag strap of claim 7 wherein said bar-tacked stitching includes three rows of stitched thread generally extending across the width of said straps with each of said rows being spaced approximately ¼ inches apart.

9. The drag strap of claim 1 wherein said first and second handle loops each include a handle grip slidably carried on each said handle loops for improved comfort and grip when pulling on said handle loops.

10. A dual handle adjustable drag strap comprising:
- a single continuous strip of foldable high tensile strength woven nylon tape;
- a first strap and a second strap defined by said nylon tape being secured together at a first distal end so that said first and second straps extend independently from each other;
- a first handle loop defined by said nylon tape on said first strap at a second distal end of said first strap;
- a second handle loop defined by said nylon tape on said second strap at a second distal end of said second strap;
- an end loop defined by said nylon tape at said first distal end;
- a coupling member carried by said end loop; and,
- a floating bull ring slidably carried along said first and second straps engaging said coupling member to adjust the drag strap for securing to an injured person.

11. The drag strap of claim 10 including a first attachment loop defined by said nylon tape on said first strap disposed below and generally adjacent said first handle loop for receiving said coupling member.

12. The drag strap of claim 11 including a second attachment loop defined by said nylon tape on said second strap disposed below and generally adjacent said second handle loop at a complimentary location to said first attachment loop on said first strap for receiving said coupling member.

13. The drag strap of claim 12 wherein said coupling member comprises a quick connector for connecting to one of said bull ring and said first and second attachment loops to vary the length of the drag strap and secure the drag strap to an injured person.

14. The drag strap of claim 13 wherein said quick connector includes an oblong metal ring with a spring clip for rapid attachment and disengagement from said bull ring and said attachment loops.

15. The drag strap of claim 12 wherein said first and second straps are secured together at said first distal end using a triple bar-tacked stitching; and wherein said first and second attachment loops are secured to said first and second straps using a triple bar-tacked stitching to resist separation under heavy loads.

16. The drag strap of claim 15 wherein said bar-tacked stitching includes three rows of stitched thread generally extending across the width of said straps with each of said rows being spaced approximately ¼ inches apart.

17. The drag strap of claim 10 wherein said bull ring has approximately a 2" diameter to receive said first and second straps and said coupling member without binding while sliding on said straps.

18. The drag strap of claim 10 wherein said first and second handle loops each include a handle grip slidably carried on each said handle loops for improved comfort and grip when pulling on said handle loops.

19. A dual handle adjustable drag strap comprising:
- a first strap and a second strap secured together generally at a first distal end;
- a first handle loop included on said first strap;
- a second handle loop included on said second strap;
- a quick connector carried by said first and second straps at said first distal end; and,
- a floating bull ring slidably carried on said first and second straps between said first distal end and said first and second handle loops for cooperating with said quick connector to adjust the drag strap for securing to an injured person.

* * * * *